United States Patent
Eshet et al.

(10) Patent No.: US 8,204,221 B1
(45) Date of Patent: Jun. 19, 2012

(54) MANIPULATING AND ENCRYPTING MEDIA PACKETS

(75) Inventors: Amit Eshet, Kiriyat Tiv'on (IL); Amit Hildesheim, Holon (IL); Alon Shafrir, Kfar Saba (IL); Amotz Hoshen, Ramat Gan (IL)

(73) Assignee: ARRIS Group, Inc, Suwanee, GA (US)

( * ) Notice: Subject to any disclaimer, the term of this patent is extended or adjusted under 35 U.S.C. 154(b) by 923 days.

(21) Appl. No.: 12/169,671

(22) Filed: Jul. 9, 2008

Related U.S. Application Data

(60) Provisional application No. 60/948,715, filed on Jul. 10, 2007.

(51) Int. Cl.
*H04N 7/167* (2011.01)
(52) U.S. Cl. .................................. 380/210; 380/212
(58) Field of Classification Search .................. 380/200, 380/201, 212, 217, 210; 713/160
See application file for complete search history.

(56) References Cited

U.S. PATENT DOCUMENTS

| | | | | |
|---|---|---|---|---|
| 6,084,909 A * | 7/2000 | Chiang et al. | ............ | 375/240.03 |
| 6,996,129 B2 * | 2/2006 | Krause et al. | ................ | 370/487 |
| 7,809,942 B2 * | 10/2010 | Baran et al. | ................... | 713/160 |
| 7,882,257 B2 * | 2/2011 | Kerr et al. | ..................... | 709/231 |
| 7,912,219 B1 * | 3/2011 | Michener et al. | ............ | 380/239 |
| 2003/0200548 A1 * | 10/2003 | Baran et al. | ..................... | 725/90 |
| 2004/0117645 A1 * | 6/2004 | Okuda et al. | .................. | 713/193 |
| 2005/0108763 A1 * | 5/2005 | Baran et al. | ..................... | 725/87 |
| 2005/0207569 A1 * | 9/2005 | Zhang et al. | ................... | 380/28 |
| 2005/0262537 A1 * | 11/2005 | Baran et al. | ..................... | 725/88 |

* cited by examiner

*Primary Examiner* — Samson Lemma
(74) *Attorney, Agent, or Firm* — Reches Patents

(57) ABSTRACT

A method for transmitting encrypted packets, the method includes: receiving a program that comprises an encrypted video stream, an encrypted audio stream and an encryption information stream; rescheduling a transmission of a certain encrypted video packet of the encrypted video stream to provide an altered encrypted video stream; rescheduling, in response to the rescheduling of the transmission of the certain encrypted video packet and in response to at least one encryption timing constraint, a first transmission of a certain encryption information item that is used to encrypt the certain encrypted video packet to provide an altered encryption information stream; and transmitting an amended program that comprises the altered encrypted video stream, the encrypted audio stream and the altered encryption information stream.

20 Claims, 12 Drawing Sheets

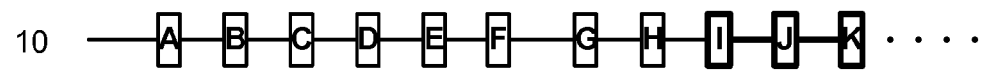
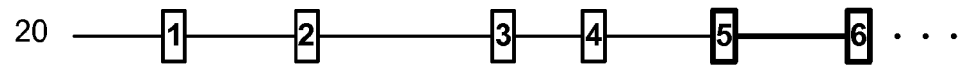
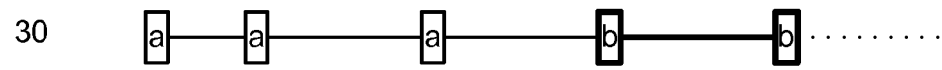
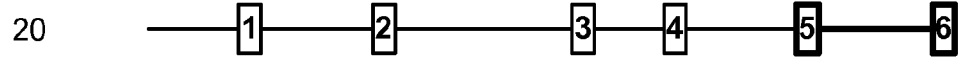
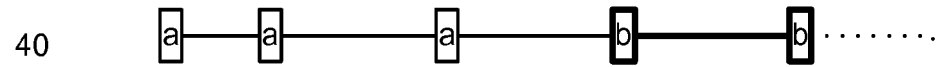
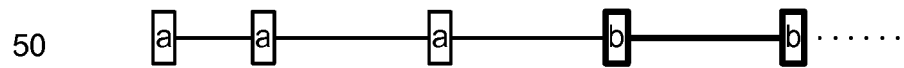
FIG. 3

```
┌─────────────────────────────────────────────────────────────────┐
│   Receiving a program that includes an encrypted video stream, an│
│   encrypted audio stream and an encryption information stream. 110│
└─────────────────────────────────────────────────────────────────┘
                                │
┌─────────────────────────────────────────────────────────────────┐
│   Rescheduling a transmission of a certain encrypted video packet│
│   of the encrypted video stream to provide an altered encrypted  │
│   video stream. 120                                              │
└─────────────────────────────────────────────────────────────────┘
                                │
┌─────────────────────────────────────────────────────────────────┐
│  Rescheduling, in response to the rescheduling of the transmission│
│  of the certain encrypted video packet, a first transmission of a│
│  certain encryption information item, such as to comply with an │
│  encryption timing constraint that requires to: (i) transmit the│
│  certain video encryption information at least a predefined     │
│  minimal period before a transmission of the certain encrypted  │
│  video packet; and (ii) transmit the certain video encryption   │
│  information at least a predefined minimal period before a      │
│  transmission of the certain audio video packet, to provide an  │
│  altered encryption information stream. The certain encrypted    │
│  video packet is a first video packet to be encrypted by the    │
│  certain encryption information item and the certain encrypted  │
│  audio packet is a first audio packet to be encrypted by the    │
│  certain encryption information item. 630                       │
└─────────────────────────────────────────────────────────────────┘
                                │
┌─────────────────────────────────────────────────────────────────┐
│  Transmitting an amended program that includes the altered      │
│  encrypted stream, the encrypted audio stream and the altered   │
│  encryption information stream. 640                             │
└─────────────────────────────────────────────────────────────────┘
```

MANIPULATING AND ENCRYPTING MEDIA PACKETS

RELATED APPLICATION

The application claims priority of US provisional patent Ser. No. 60/948,715 filing date Jul. 10, 2007 which is incorporated herein by reference.

FIELD OF THE INVENTION

The present invention relates to a system, method and computer program product for manipulating and encrypting media packets.

BACKGROUND OF THE INVENTION

Multiplexing and especially statistical multiplexing as well as re-scheduling of media packets offer a better utilization of bandwidth limited communication channels.

Encryption of media streams is used in conditional access systems. A media stream can be scrambled with a secret control word. The control word can be encrypted before it is transmitted to a receiver as an entitlement control message (ECM). The receiver will decrypt the control word only when authorized to do so—when it receives an entitlement management message (EMM). The EMMs can be allocated per user.

Combining encryption techniques with statistical multiplexing and/or re-scheduling poses various problems.

Performing multiplexing before encryption is a resource-consuming solution when the same media stream should be sent over multiple channels—so it has to be encrypted several times.

Another approach limits the bit rate of the media stream to provide constant bit rate media streams of a reduced bit rate in order to guarantee that the media stream, after the encryption, will not exceed an allowable threshold. This approach can unnecessarily limit the bit rate of the media stream, resulting in lower quality and even in an inefficient utilization of channel bandwidth.

There is a growing need to provide efficient methods, systems and computer program products for manipulating media streams.

SUMMARY OF THE PRESENT INVENTION

The present invention provides a method and a system as described in the accompanying claims. Specific embodiments of the invention are set forth in the dependent claims. These and other aspects of the invention will be apparent from and elucidated with reference to the embodiments described hereinafter.

A method for transmitting encrypted packets, the method includes: receiving a program that comprises an encrypted video stream, an encrypted audio stream and an encryption information stream; rescheduling a transmission of a certain encrypted video packet of the encrypted video stream to provide an altered encrypted video stream; rescheduling, in response to the rescheduling of the transmission of the certain encrypted video packet and in response to at least one encryption timing constraint, a first transmission of a certain encryption information item that is used to encrypt the certain encrypted video packet to provide an altered encryption information stream; and transmitting an amended program that comprises the altered encrypted video stream, the encrypted audio stream and the altered encryption information stream.

A computer program product that comprises a computer readable medium that stores instructions for: receiving a program that comprises an encrypted video stream, an encrypted audio stream and an encryption information stream; rescheduling a transmission of a certain encrypted video packet of the encrypted video stream to provide an altered encrypted video stream; rescheduling, in response to the rescheduling of the transmission of the certain encrypted video packet and in response to at least one encryption timing constraint, a first transmission of a certain encryption information item that is used to encrypt the certain encrypted video packet to provide an altered encryption information stream; and transmitting an amended program that comprises the altered encrypted video stream, the encrypted audio stream and the altered encryption information stream.

A system, comprising: a re-scheduler, adapted to: receive a program that comprises an encrypted video stream, an encrypted audio stream and an encryption information stream; reschedule a transmission of a certain encrypted video packet of the encrypted video stream to provide an altered encrypted video stream; and reschedule, in response to the rescheduling of the transmission of the certain encrypted video packet and in response to at least one encryption timing constraint, a first transmission of a certain encryption information item that is used to encrypt the certain encrypted video packet to provide an altered encryption information stream; and a transmitter, adapted to transmit an amended program that comprises the altered encrypted video stream, the encrypted audio stream and the altered encryption information stream.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates an encrypted video stream, an encrypted audio stream, an encryption information stream, an video encryption information stream and an audio encryption information stream according to an embodiment of the invention;

FIG. 6 illustrates a method according to an embodiment of the invention;

DETAILED DESCRIPTION OF PREFERRED EMBODIMENTS

It has been shown that encryption and media stream processing can be combined by re-scheduling a transmission of encrypted media packets and then rescheduling a transmission of relevant encryption information items in response to at least one encryption timing constraint.

Figure 1:
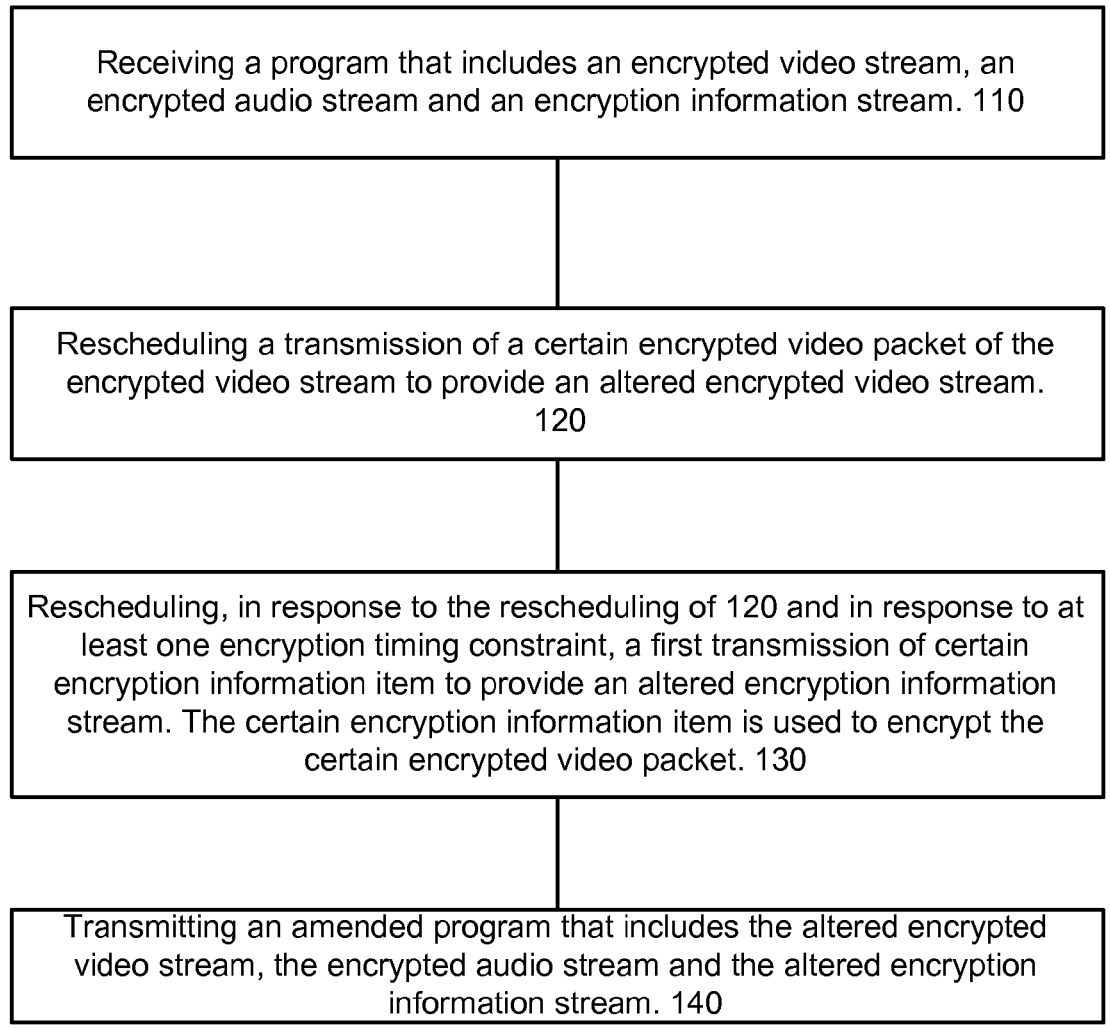
FIG. 1 illustrates a method according to an embodiment of the invention.

FIG. 1 illustrates method 100 according to an embodiment of the invention.

Method 100 starts by stage 110 of receiving a program that includes an encrypted video stream, an encrypted audio stream and an encryption information stream.

Conveniently, timing information (especially timestamps) required for rescheduling is not encrypted. Thus, stage 110 includes receiving the encrypted video stream that includes non-encrypted timing information and receiving the encrypted audio stream that comprises non-encrypted timing information. Conveniently, metadata that describes access unit decoding time stamp (DTS) and indicates the location of the access unit in the video stream can be inserted in the video stream before encryption.

Stage 110 is followed by stage 120 of rescheduling a transmission of a certain encrypted video packet of the encrypted video stream to provide an altered encrypted video stream.

Stage 120 can include re-scheduling multiple encrypted video packets. Typically, the re-scheduling of one encrypted video packet will cause a re-scheduling of other encrypted video packets, such as the encrypted video packets that are transmitted after the certain encrypted video packet.

Stage 120 can be a part of a rate-shaping algorithm that provides an encrypted video stream that complies with the timing constraint of a video stream. Various prior art methods for re-scheduling media streams can be applied during stage 120.

Stage 120 can provide an MPEG-2 compliant video stream or any other standardized video stream.

Stage 120 can be affected by one or more encryption timing constraints but this is not necessarily so. These encryption timing constrains are usually aimed to prevent an encryption of a certain video encrypted packet (that should be decrypted by a certain encryption information item) by another encryption information item that can be identified as the certain encryption information item. These two different encryption information items should be used during different (usually non-consecutive) crypto periods but are identified by the same identifier.

Conveniently, stage 120 is responsive to an encryption timing constraint that prevents encryption by the wrong encryption information item.

The encryption timing constraints do not substantially limit the re-scheduling of stage 120 and are usually two (or more) crypto periods long. Thus, stage 120 can include rescheduling the transmission of the certain encrypted video packet in response to an encryption timing constraint that prevents a transmission of the certain video encrypted packet during a (k+2)'th crypto-period. Index k is an integer. The certain encryption information item is utilized during a k'th crypto period. The other encryption information item is utilized during the (k+2)'th crypto period. The certain encryption information item and the other encryption information item are identified by the same encryption information identifier.

It is noted that stage 120 of re-scheduling of video can be responsive to network parameters such as allowed jitter. For example, if the transmission is over an asynchronous network or a network that allows larger jitters then the re-scheduling of the encrypted video packet can be more relaxed in comparison to rescheduling of an encrypted video packet that is sent over synchronous networks that to not tolerate large jitters. The re-scheduling should not change the order of the encrypted video packets. Non-limiting examples of asynchronous networks include Ethernet, DSL networks and the like.

Stage 120 is followed by stage 130 of rescheduling, in response to the rescheduling of stage 120 and in response to at least one encryption timing constraint, a first transmission of certain encryption information item to provide an altered encryption information stream. The certain encryption information item is used to encrypt the certain encrypted video packet. It can be an entitlement control message (ECM) that facilitates the decryption of the encrypted video packet by a control word.

Stage 130 is followed by stage 140 of transmitting an amended program that includes the altered encrypted video stream, the encrypted audio stream and the altered encryption information stream.

Figure 2:
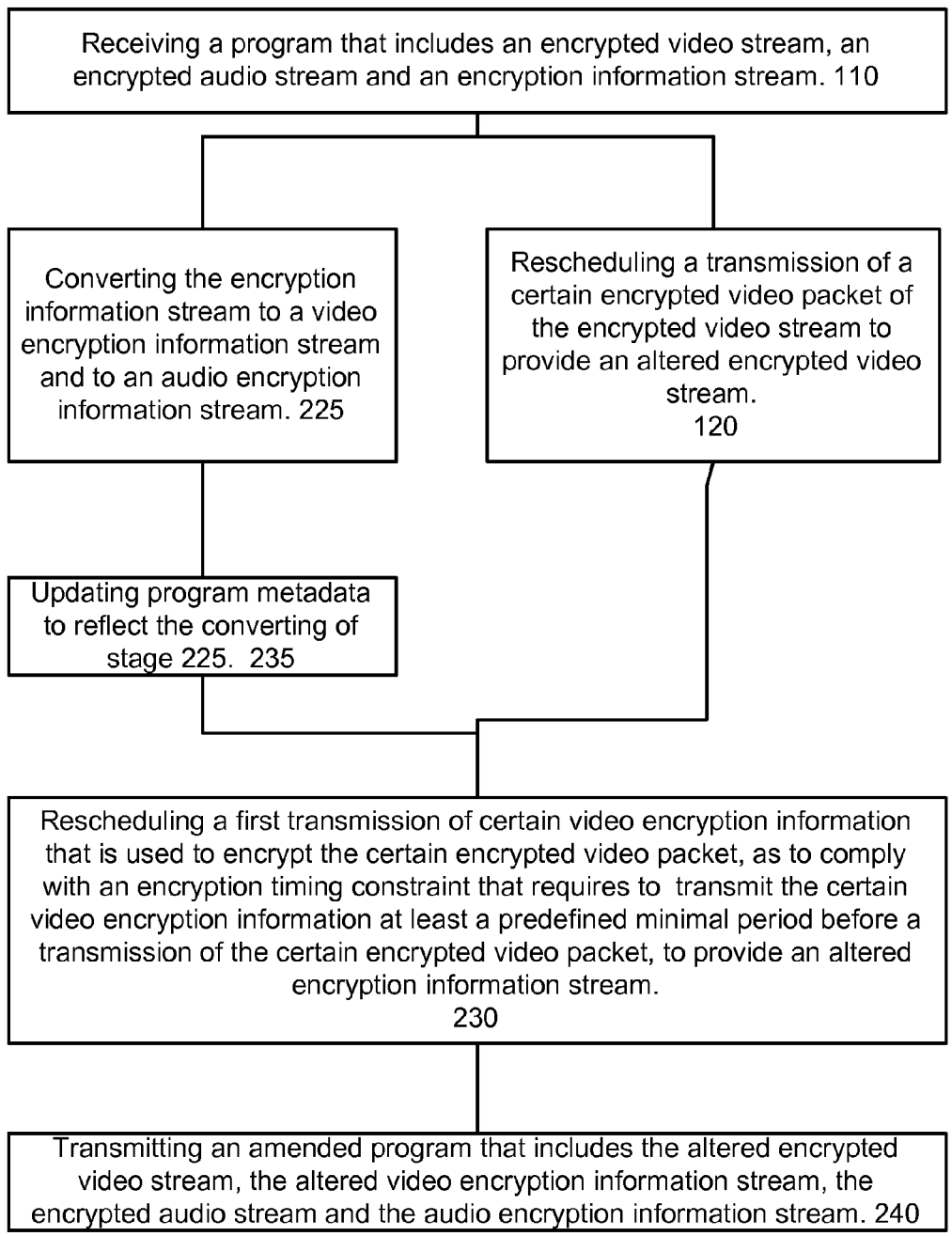
FIG. 2 illustrates a method according to an embodiment of the invention.

FIG. 2 illustrates method 200 according to an embodiment of the invention.

Method 200 starts by stage 110. Stage 110 is followed by stages 120 and 225.

Stage 225 includes converting the encryption information stream to a video encryption information stream and to an audio encryption information stream.

Stages 120 and 225 are followed by stage 230 and 235.

Stage 230 includes rescheduling a first transmission of certain video encryption information item that is used to encrypt the certain encrypted video packet to provide an altered encryption information stream.

Stage 230 includes rescheduling the first transmission of the certain encryption information item such as to comply with an encryption timing constraint that requires to transmit the certain video encryption information item at least a predefined minimal period before a transmission of the certain encrypted video packet. The certain encrypted video packet is a first video packet to be encrypted by the certain video encryption information item. According to an embodiment of the invention stage 230 can include introducing a constant delay of all video encryption information items and especially introducing a constant delay that matches at least the minimal delay of any encrypted video packet in the stream.

Stage 235 includes updating program metadata to reflect the converting of stage 225. For example, a Program Map Table should be updated to include a first program identifier (PID) for the audio encryption information stream and a second program identifier (PID) for the video encryption information stream.

Stages 230 and 235 are followed by stage 240 of transmitting an amended program that includes the altered encrypted video stream, the altered video encryption information stream, the encrypted audio stream and the audio encryption information stream.

Method 200 can be used when transmitting the amended program towards a receiver that can support a reception of a reception of an encryption information stream per video and audio streams.

FIG. 3 illustrates encrypted video stream 10, encrypted audio stream 20, encryption information stream 30, video encryption information stream 40 and audio encryption information stream 50 according to an embodiment of the invention.

The conversion of encryption information stream 30 to video encryption information stream 40 and audio encryption information stream 50 can include duplicating the encryption information stream 30.

Figure 4:
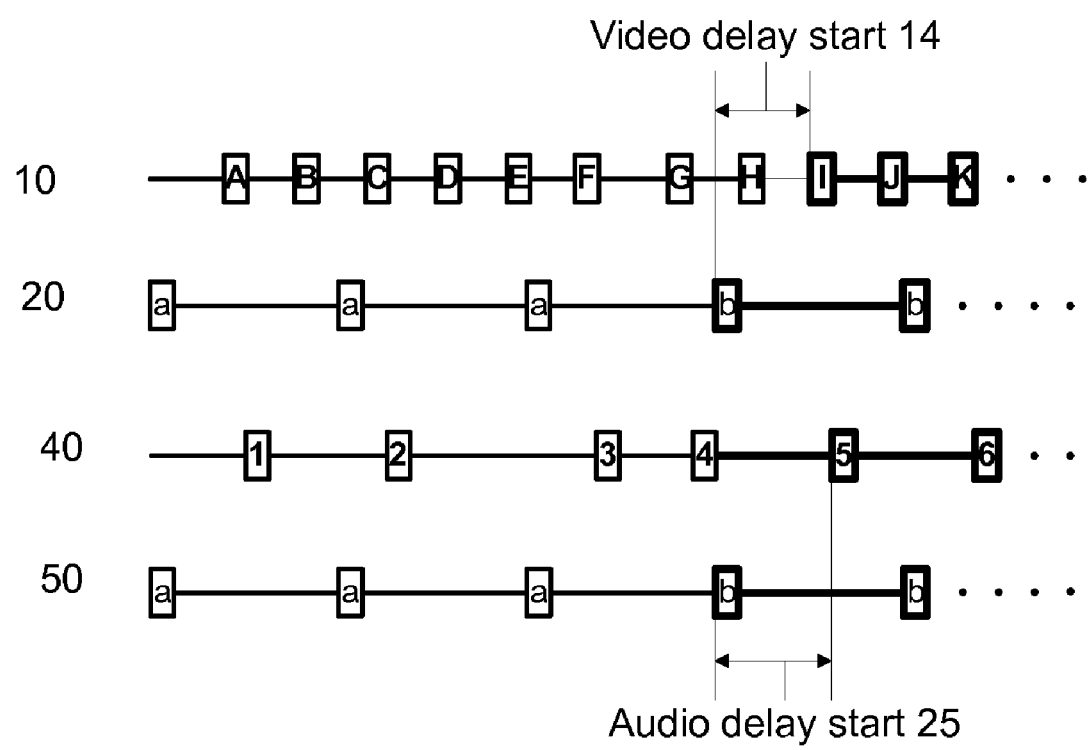
FIG. 4 illustrates an encrypted video stream, an encrypted audio stream, a video encryption information stream and an audio encryption information stream.

FIG. 4 illustrates encrypted video stream 10, encrypted audio stream 20, video encryption information stream 40 and audio encryption information stream 50. FIG. 4 also illustrates an encryption timing constraint that requires to transmit the certain video encryption information item at least a predefined minimal period (denoted video delay start 14) before a transmission of the certain encrypted video packet. FIG. 4 further illustrates an encryption timing constraint that requires to transmit the certain audio encryption information item at least a predefined minimal period (denoted audio delay start 25) before a transmission of the certain encrypted audio packet.

Figure 5:
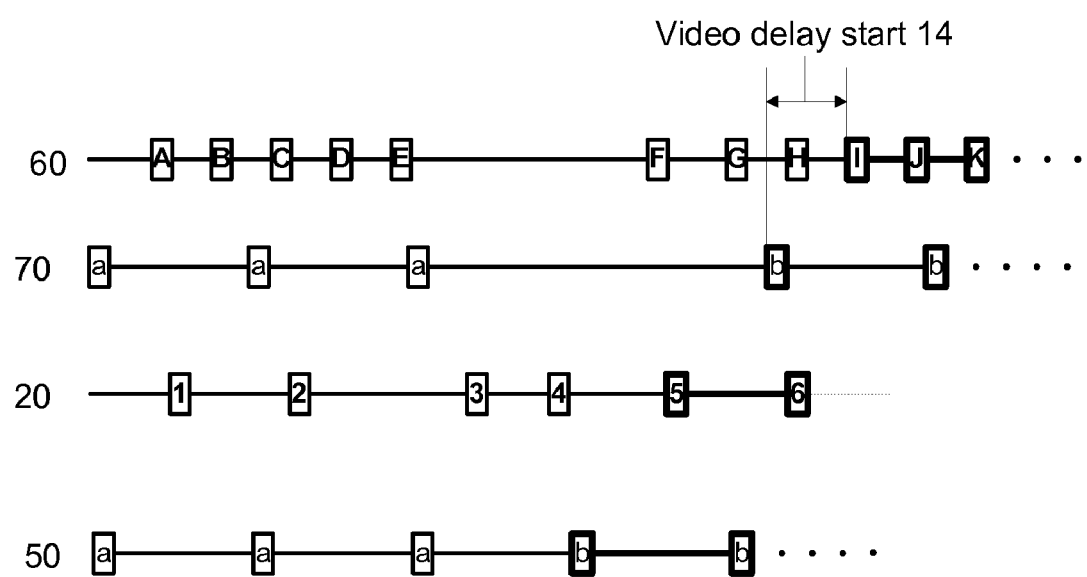
FIG. 5 illustrates an amended encrypted video stream, an encrypted audio stream, an amended video encryption information stream and an audio encryption information stream according to an embodiment of the invention.

FIG. 5 illustrates amended encrypted video stream 60, encrypted audio stream 20, amended video encryption information stream 70 and audio encryption information stream 50 according to an embodiment of the invention.

The transmission of the certain encrypted video packet (denoted I) was re-scheduled (delayed) and accordingly the first transmission of the certain encrypted information item (denoted b) was re-scheduled. The certain video encryption information item is transmitted at least a predefined minimal period (video delay start 14) before a transmission of the certain encrypted video packet.

It is noted that the certain encrypted video packet was re-scheduled in response to a re-scheduling of another encrypted video packet (denoted F) that preceded it.

FIG. 6 illustrates method 600 according to an embodiment of the invention.

Method 200 starts by stage 110. Stage 110 is followed by stage 120.

Stage 120 is followed by stage 630 of rescheduling, in response to the rescheduling of the transmission of the certain encrypted video packet, a first transmission of a certain encryption information item, such as to comply with an encryption timing constraint that requires to: (i) transmit the certain encryption information item at least a predefined minimal period before a transmission of the certain encrypted video packet; and (ii) transmit the certain encryption information item at least a predefined minimal period before a transmission of the certain audio video packet, to provide an altered encryption information stream. The certain encrypted video packet is a first video packet to be encrypted by the certain encryption information item and the certain encrypted audio packet is a first audio packet to be encrypted by the certain encryption information item. According to an embodiment of the invention stage 630 can include introducing a constant delay of all encryption information items and especially introducing a constant delay that matches at least the minimal delay of any encrypted video packet in the stream.

Stage 630 is followed by stage 140 of transmitting an amended program that includes the altered encrypted stream, the encrypted audio stream and the altered encryption information stream.

Method 600 can be used when transmitting the amended program towards a receiver that can support a reception of single encryption information item per crypto period.

Figure 7:
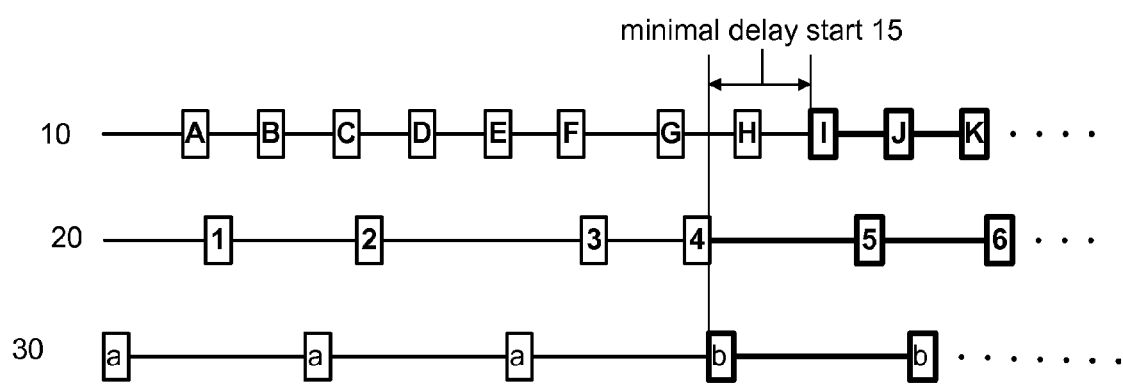
FIG. 7 illustrates an encrypted video stream, an encrypted audio stream and encryption information stream.

FIG. 7 illustrates encrypted video stream 10, encrypted audio stream 20 and encryption information stream 30.

FIG. 7 also illustrates an encryption timing constraint that requires transmitting the certain encryption information item (denoted b) at least a predefined minimal period (denoted minimal delay start 15) before a transmission of either one of the certain encrypted video packet (denoted I) and the certain encrypted audio packet (denoted 5). In FIG. 7 the certain encryption information item is transmitted a predefined minimal period before the transmission of the certain encrypted video packet.

Figure 8:
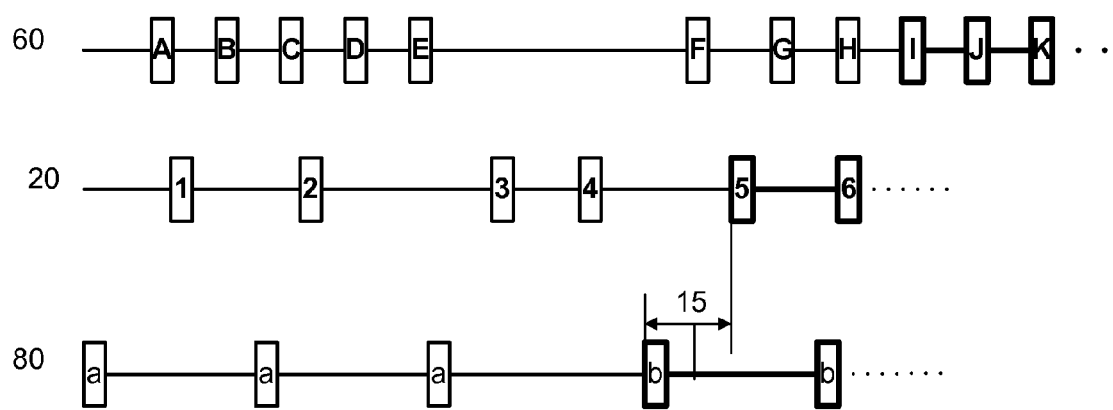
FIG. 8 illustrates an amended encrypted video stream, an encrypted audio stream and an amended encryption information stream according to an embodiment of the invention.

FIG. 8 illustrates amended encrypted video stream 60, encrypted audio stream 20 and amended encryption information stream 80 according to an embodiment of the invention.

The transmission of the certain encrypted video packet (denoted I) was re-scheduled (delayed) and accordingly the first transmission of the certain encrypted information item (denoted b) was re-scheduled.

FIG. 8 also illustrates an encryption timing constraint that requires to transmit the certain encryption information item (denoted b) at least a predefined minimal period (denoted minimal delay start 15) before a transmission of either one of the certain encrypted video packet (denoted I) and the certain encrypted audio packet (denoted 5). In FIG. 8 the certain encryption information item is transmitted a predefined minimal period before the transmission of the certain encrypted audio packet.

Figure 9:
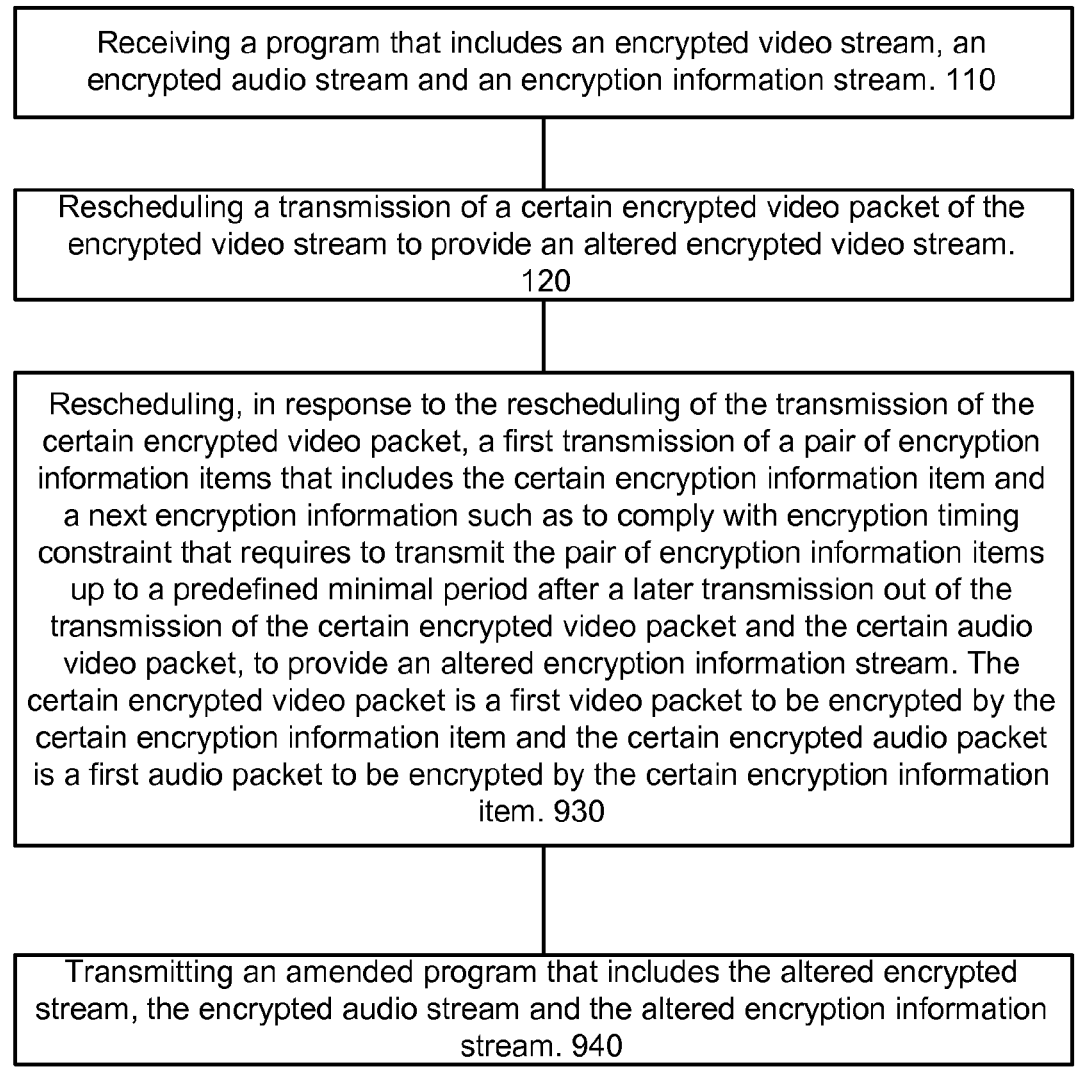
FIG. 9 illustrates a method according to an embodiment of the invention.

FIG. 9 illustrates method 900 according to an embodiment of the invention.

Method 900 starts by stage 110. Stage 110 is followed by stage 120.

Stage 120 is followed by stage 930 of rescheduling, in response to the rescheduling of the transmission of the certain encrypted video packet, a first transmission of a pair of encryption information items that includes the certain encryption information item and a next encryption information item such as to comply with encryption timing constraint that requires to transmit the pair of encryption information items up to a predefined minimal period after a later transmission out of the transmission of the certain encrypted video packet and the certain audio video packet, to provide an altered encryption information stream. The certain encrypted video packet is a first video packet to be encrypted by the certain encryption information item and the certain encrypted audio packet is a first audio packet to be encrypted by the certain encryption information item. According to an embodiment of the invention stage 930 can include introducing a constant delay of all video encryption information items and especially introducing a constant delay that matches at least the minimal delay of any encrypted video packet in the stream.

Additionally or alternatively, stage 930 can include rescheduling, in response to the rescheduling of the transmission of the certain encrypted video packet, a first transmission of a pair of encryption information items that includes the certain encryption information item and a next encryption information item such as to comply with encryption timing constraint that requires to transmit the pair of encryption information items up to a predefined minimal period after a transmission of the certain encrypted video packet.

Additionally or alternatively, stage 930 can include rescheduling, in response to the rescheduling of the transmission of the certain encrypted video packet, a first transmission of a pair of encryption information items that includes the certain encryption information item and a next encryption information item such as to comply with encryption timing constraint that requires to transmit the pair of encryption information items at least a predefined minimal period after a transmission of a last encrypted video packet that preceded the certain encrypted video packet and at least a predefined minimal period after a transmission of a last encrypted audio packet that preceded the certain encrypted audio packet.

Referring to the example set fourth in FIG. 6—the first transmission of pair (b,c) should follow (by at least a predetermined minimal period) a transmission of encrypted video packet I and of audio packet 4.

Stage 930 is followed by stage 140 of transmitting an amended program that includes the altered encrypted stream, the encrypted audio stream and the altered encryption information stream.

Method 900 can be used when transmitting the amended program towards a receiver that can support a reception of pairs of encryption information items per crypto period.

Figure 10:
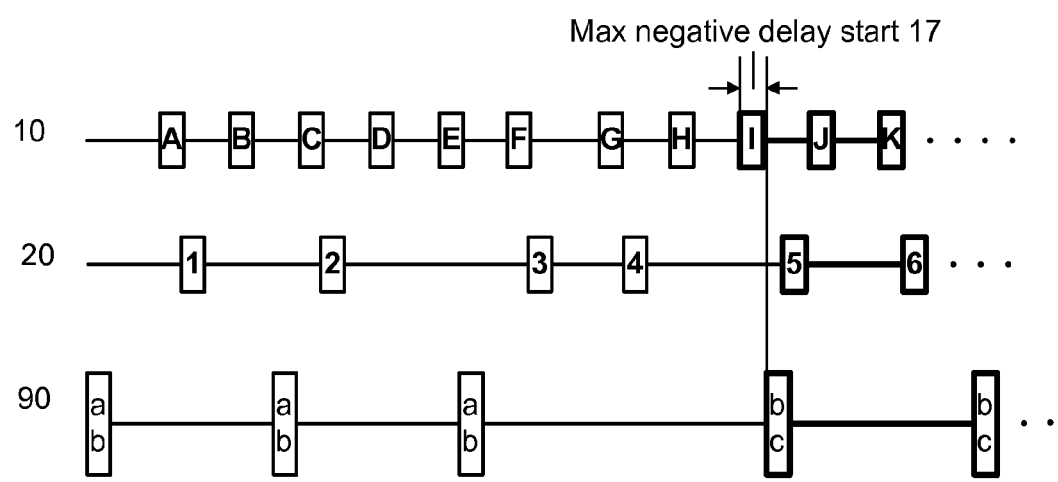
FIG. 10 illustrates an encrypted video stream, an encrypted audio stream and an encryption information stream.

FIG. 10 illustrates encrypted video stream 10, encrypted audio stream 20 and encryption information stream 90. Encryption information stream 90 includes pairs of encryption keys. Each pair includes an encryption information item associated with the current crypto period and a next encryption information item to be used during the next crypto period.

FIG. 10 also illustrates an encryption timing constraint that requires to transmit the first pair of encryption information items (b,c) up to a predefined minimal period (max negative delay start 17) after a transmission of the certain encrypted video packet (denoted I).

Figure 11:
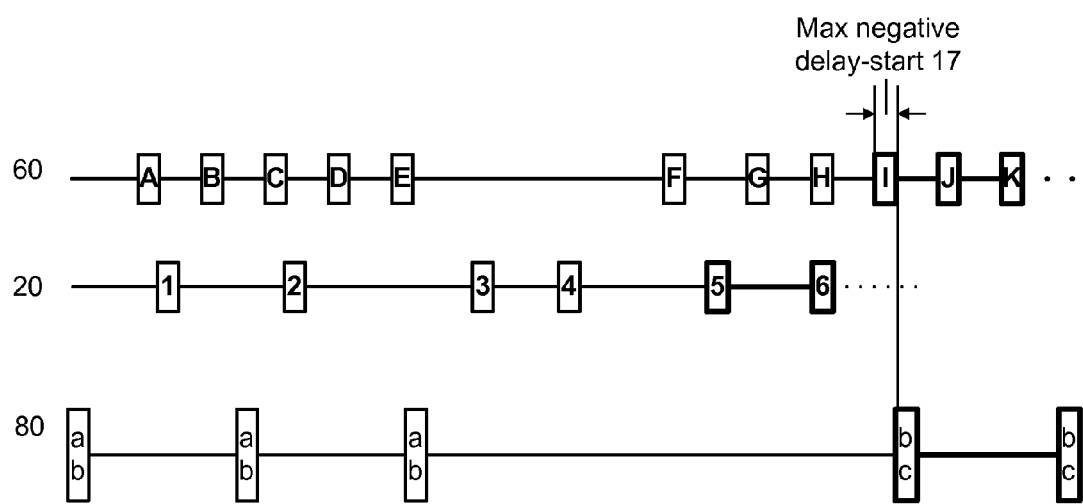
FIG. 11 illustrates an amended encrypted video stream, an encrypted audio stream, and an amended encryption information stream according to an embodiment of the invention.

FIG. 11 illustrates amended encrypted video stream 60, encrypted audio stream 20 and amended encryption information stream 80 according to an embodiment of the invention.

The transmission of the certain encrypted video packet (denoted I) was re-scheduled (delayed) and accordingly the first transmission of the certain pair of encryption information items (denoted b,c) was re-scheduled.

FIG. 11 also illustrates an encryption timing constraint that requires to transmit the first pair of encryption information items (b,c) up to a predefined minimal period after a transmission of the certain encrypted video packet (denoted I).

Typically, each method out of methods 100, 200, 600 and 900 are applied on multiple programs to provide (and to transmit) an amended programs multiplex. Accordingly, these methods can include statistically multiplexing multiple amended programs. Alternatively, these methods include statistically multiplexing one or more amended programs with one or more programs that were not amended.

Each of the mentioned above methods can include re-scheduling a certain encrypted audio packet.

It is noted that a combination of the mentioned above methods (or any of their stages) can be provided.

Figure 12:
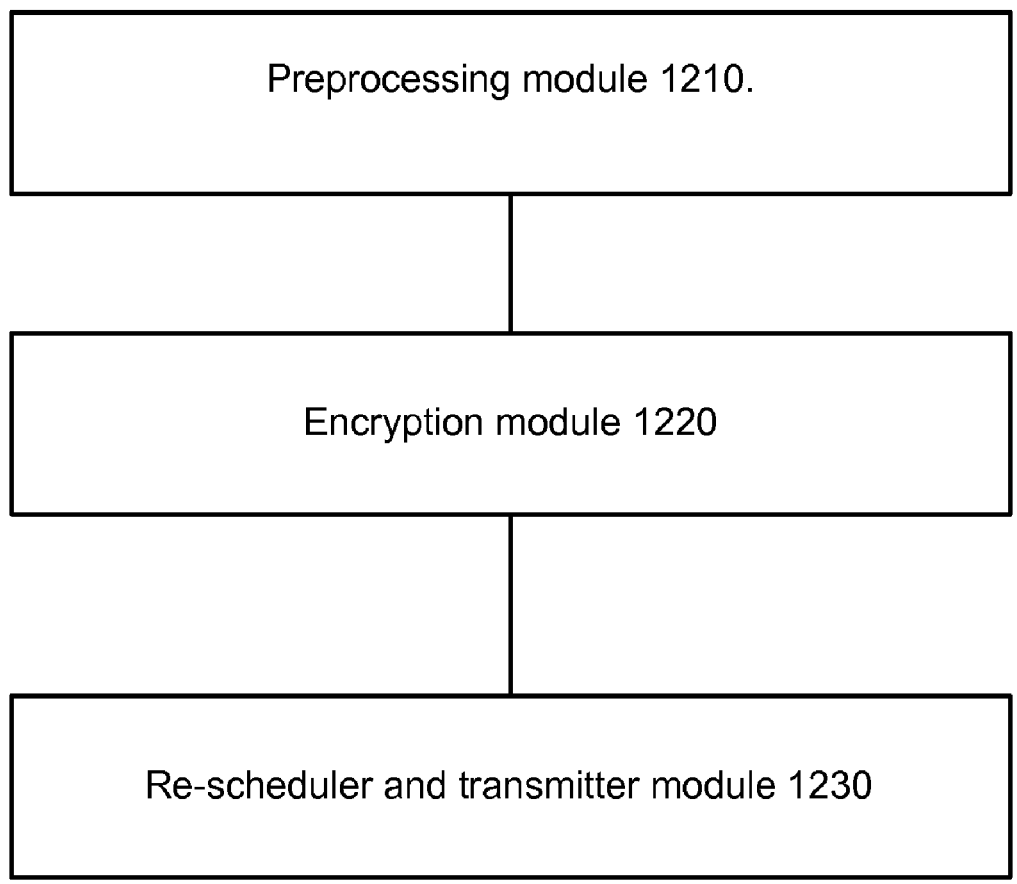
FIG. 12 illustrates a system according to an embodiment of the invention.

FIG. 12 illustrates system 1200 according to an embodiment of the invention.

System 1200 can include only re-scheduler and transmitter module 1230 but can also include encryption module 1220 and preprocessing module 1210.

Re-scheduler and transmitter module 1230 includes re-scheduler 1232 and transmitter 1234. It can apply any method of methods 100, 200, 600 and 900 or a combination thereof. It can apply any combination of any stage of the mentioned above methods.

Preprocessing module 1210 can generate metadata such as timing information that will not be encrypted by encryption module 1220. It can re-schedule a transmission of video packets (for example—by utilizing more bandwidth of a link between preprocessing module 1210 and encryption module 1220 or by compressing the video packets) in order to speed up the provision of these video packets to encryption module 1220 and then (after being encrypted) to re-scheduler and transmitter module 1230. This can allow re-scheduler and transmitter module 1230 more time to re-schedule these encrypted video packets.

Either one of the mentioned above methods (or a combination of any of their stages) can be applied by a computer that executes instructions. These instructions can be stored in a tangible computer readable medium of a computer program product. The computer readable medium can be a memory chip, a disk, a diskette, a tape, a memory or a storage hardware module, and the like. For example, a computer program product can be provided. It includes a computer readable medium that stores instructions for: receiving a program that comprises an encrypted video stream, an encrypted audio stream and an encryption information stream; rescheduling a transmission of a certain encrypted video packet of the encrypted video stream to provide an altered encrypted video stream; rescheduling, in response to the rescheduling of the transmission of the certain encrypted video packet and in response to at least one encryption timing constraint, a first transmission of a certain encryption information item that is used to encrypt the certain encrypted video packet to provide an altered encryption information stream; and transmitting an amended program that comprises the altered encrypted video stream, the encrypted audio stream and the altered encryption information stream.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

We claim:

1. A method for transmitting encrypted packets, the method comprises:
    receiving a program that comprises an encrypted video stream, an encrypted audio stream and an encryption information stream;
    rescheduling a transmission of a certain encrypted video packet of the encrypted video stream to provide an altered encrypted video stream;
    rescheduling, in response to the rescheduling of the transmission of the certain encrypted video packet and in response to at least one encryption timing constraint, a first transmission of a certain encryption information item that is used to encrypt the certain encrypted video packet to provide an altered encryption information stream; and
    transmitting an amended program that comprises the altered encrypted video stream, the encrypted audio stream and the altered encryption information stream.

2. The method according to claim 1 comprising statistically multiplexing the amended program with at least one other amended program.

3. The method according to claim 1 comprising receiving the encrypted video stream that comprises non-encrypted timing information.

4. The method according to claim 1 comprising:
    converting the encryption information stream to a video encryption information stream and to an audio encryption information stream;
    rescheduling a first transmission of a certain video encryption information item that is used to encrypt the certain encrypted video packet to provide an altered encryption information stream; and
    transmitting an amended program that comprises the altered encrypted video stream, the altered video encryption information stream, the encrypted audio stream and the audio encryption information stream.

5. The method according to claim 4 comprising rescheduling the first transmission of the certain video encryption information item such as to comply with an encryption timing constraint that requires to transmit the certain video encryption information item at least a predefined minimal period before a transmission of the certain encrypted video packet; wherein the certain encrypted video packet is a first video packet to be encrypted by the certain video encryption information item.

6. The method according to claim 4 comprising updating program metadata to reflect the converting.

7. The method according to claim 1 comprising rescheduling, in response to the rescheduling of the transmission of the certain encrypted video packet, a first transmission of a certain encryption information item, to provide an altered encryption information stream; wherein the certain encrypted video packet is a first video packet to be encrypted by the certain encryption information item and wherein the certain encrypted audio packet is a first audio packet to be encrypted by the certain encryption information item.

8. The method according to claim 7 comprising rescheduling the a first transmission of the certain encryption information item such as to comply with encryption timing constraints that requires to:
    transmit the certain encryption information item at least a predefined minimal period before a transmission of the certain encrypted video packet; and
    transmit the certain encryption information item at least a predefined minimal period before a transmission of the certain audio video packet.

9. The method according to claim 7 comprising rescheduling a first transmission of a pair of encryption information items that comprises the certain encryption information item and a next encryption information item such as to comply with encryption timing constraint that requires to transmit the pair of encryption information items up to a predefined minimal period after a later transmission out of the transmission of the certain encrypted video packet and the certain audio video packet.

10. The method according to claim 7 comprising rescheduling a first transmission of a pair of encryption information items that includes the certain encryption information item and a next encryption information item such as to comply with encryption timing constraint that requires to transmit the pair of encryption information items up to a predefined minimal period after a transmission of the certain encrypted video packet.

11. The method according to claim 7 comprising rescheduling, in response to the rescheduling of the transmission of the certain encrypted video packet, a first transmission of a pair of encryption information items that includes the certain encryption information item and a next encryption information item such as to comply with encryption timing constraint that requires to transmit the pair of encryption information items at least a predefined minimal period after a transmission of a last encrypted video packet that preceded the certain encrypted video packet and at least a predefined minimal period after a transmission of a last encrypted audio packet that preceded the certain encrypted audio packet.

12. The method according to claim 1 comprising rescheduling a transmission of a certain encrypted video packet of the encrypted video stream to provide an MPEG-2 compliant altered encrypted video stream.

13. The method according to claim 1 comprising rescheduling the transmission of the certain encrypted video packet in response to an encryption timing constraint that prevents encrypting the certain video encrypted packet by an encryption information item that differs from the certain encryption information item.

14. The method according to claim 1 comprising rescheduling the transmission of the certain encrypted video packet in response to an encryption timing constraint that prevents a transmission of the certain video encrypted packet during a crypto-period that is associated with an encryption information item that differs from the certain encryption information item but is identified as the certain encryption information item.

15. The method according to claim 1 comprising transmitting the amended program towards a receiver that supports a reception of single encryption information item per crypto period.

16. The method according to claim 1 comprising transmitting the amended program towards a receiver that supports a reception of pairs of encryption information items per crypto period.

17. The method according to claim 1 comprising rescheduling the transmission of the certain encrypted video packet in response to an encryption timing constraint that prevents a transmission of the certain video encrypted packet during a (k+2)'th crypto-period; wherein k is an integer; wherein the certain encryption information item is utilized during a k'th crypto period; wherein another encryption information item is utilized during the (k+2)'th crypto period; and wherein the certain encryption information item and the other encryption information item are identified by a same encryption information identifier.

18. The method according to claim 1 comprising rescheduling transmissions of encrypted video packets of the encrypted video stream while maintaining an order of the encrypted video packets of the encrypted video stream and while complying with jitter timing limitations.

19. The method according to claim 1 comprising rescheduling, in response to rescheduling of transmissions multiple encrypted video packets, the transmissions of multiple encryption information items, by introducing a constant delay.

20. A computer program product that comprises a non-transitory computer readable medium that stores instructions for: receiving a program that comprises an encrypted video stream, an encrypted audio stream and an encryption information stream;

rescheduling a transmission of a certain encrypted video packet of the encrypted video stream to provide an altered encrypted video stream;

rescheduling, in response to the rescheduling of the transmission of the certain encrypted video packet and in response to at least one encryption timing constraint, a first transmission of a certain encryption information item that is used to encrypt the certain encrypted video packet to provide an altered encryption information stream; and transmitting an amended program that comprises the altered encrypted video stream, the encrypted audio stream and the altered encryption information stream.

* * * * *